United States Patent [19]
Koriyama

[11] Patent Number: 5,469,316
[45] Date of Patent: Nov. 21, 1995

[54] ACTUATOR FOR MAGNETIC DISKS AND HAVING A VCM SUPPORT WITH A RECESS

[75] Inventor: Hiroshi Koriyama, Tokyo, Japan

[73] Assignee: NEC Corporation, Japan

[21] Appl. No.: 285,402

[22] Filed: Aug. 3, 1994

[30] Foreign Application Priority Data

Aug. 10, 1993 [JP] Japan .................................. 5-218084

[51] Int. Cl.⁶ ............................................ G11B 5/55
[52] U.S. Cl. ............................................ 360/106
[58] Field of Search ................................. 360/106

[56] References Cited

U.S. PATENT DOCUMENTS

| | | | |
|---|---|---|---|
| 5,233,493 | 8/1993 | Eliason | 360/106 |
| 5,270,887 | 12/1993 | Edwards | 360/106 |
| 5,343,345 | 8/1994 | Gilovich | 306/106 |

*Primary Examiner*—A. J. Heinz
*Attorney, Agent, or Firm*—Laff, Whitesel, Conte & Saret, Ltd.

[57] ABSTRACT

In a magnetic disk apparatus, a head driving device has a permanent magnet assembly and an arm assembly. The permanent magnet assembly has a pair of permanent magnets whose different polarities face each other with the intermediary of a pair of support members. In the arm assembly, an arm carries a magnetic head on one end and a coil on the other end. A coil is inserted between the opposite polarities of the magnets, so that the arm assembly is rotated by the Lorentz force generated in the coil. The range over which the arm assembly is rotatable is determined by the support members against which the arm assembly selectively abut. At least one of the support members is formed with a recess or groove for receiving part of the arm assembly when the assembly is rotated. Hence, despite that the support member has a substantial thickness, the movable range of the arm assembly is the same as when the support member has a small thickness. Such a support member prevents the magnetic circuit from saturating and frees the head from the influence of flux leakage.

7 Claims, 3 Drawing Sheets

5,469,316

ACTUATOR FOR MAGNETIC DISKS AND HAVING A VCM SUPPORT WITH A RECESS

BACKGROUND OF THE INVENTION

The present invention relates to a magnetic disk apparatus for recording and reproducing data out of a magnetic disk and, more particularly, to a device for driving a magnetic head included in the apparatus for writing and reading data out of of the disk.

A magnetic disk apparatus or similar magnetic data recording and reproducing apparatus is extensively used and includes a device for driving a magnetic head which writes and reads data out of a magnetic disk. It is a common practice with this kind of device to mount the head on a rotary carriage. While a magnetic disk spins at high speed, the head writes or read data in or out of the disk while rising above the disk due to a pneumatic pressure generated by the spinning disk. The head includes a servo head for reading a positioning pattern stored in the disk. The carriage is brought to a predetermined position by a servo loop based on the positioning pattern read out by the servo head. Today, a carriage positioning speed, i.e., a seek time shorter than 10 milliseconds is available. Various approaches have been proposed to reduce the overall size of the magnetic disk apparatus and increase the recording density of the disk. For example, the recording density may be increased by increasing the bit density of tracks or by increasing the track density, i.e., reducing the track width. Recently, even a track width smaller than 10 microns has been achieved.

With the conventional approaches, however, it is difficult to miniaturize the head driving device and, therefore, the magnetic disk apparatus without degrading the writing and reading ability of the head.

SUMMARY OF THE INVENTION

It is, therefore, an object of the present invention to provide a head driving device for a magnetic disk apparatus which implements both the miniaturization of the apparatus and the enhancement of the writing and reading ability of a magnetic head.

In accordance with the present invention, a device for driving a magnetic head which is included in a magnetic data recording and reproducing apparatus for writing and reading data out of a magnetic recording medium has an arm assembly having an arm carrying the head on one end and a coil on the other end, and a rotary shaft supporting the arm between the coil and the head and rotatably mounting the arm to a base of the apparatus. A permanent magnet assembly has a pair of yokes, a pair of permanent magnets having opposite polarities thereof facing each other at a predetermined distance, and a pair of support members supporting the yokes and magnets. The permanent magnet assembly is affixed to the base. At least one of the support members is formed with a recess for receiving part of the arm assembly when the arm assembly is rotated.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
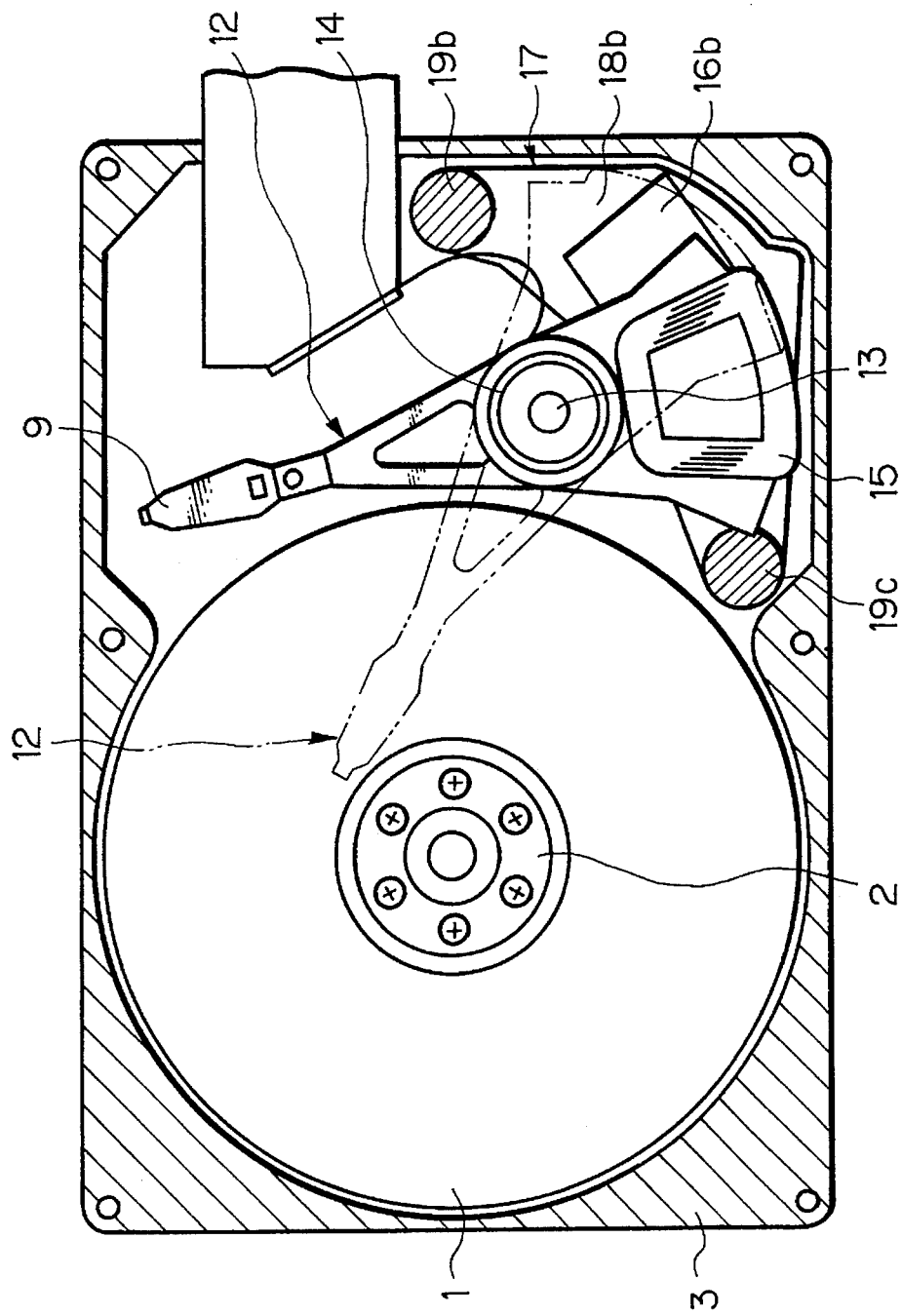
FIG. 1 is a plan view of a conventional head driving device and a magnetic disk apparatus using it.

To better understand the present invention, a brief reference will be made to a conventional head driving device and a magnetic disk apparatus using it, shown in FIG. 1. As shown, a plurality of magnetic disks 1 (only one is visible) are supported by a base 3 at opposite ends of a spindle shaft 2 via a spindle hub and a bearing, not shown. A disk drive motor, not shown, causes the disks 1 to spin via the spindle shaft 2. A magnetic head 9 is associated with each of the disks 1 and mounted on an arm assembly 12. The arm assembly 12 is supported by a rotary shaft 13 which is mounted on the base 3 via a plurality of bearings 14 (only one is visible). A coil 15 is affixed to the arm assembly 12 and cooperates with a permanent magnet assembly 17 to generate a magnetic circuit. The magnetic circuit causes the head 9 to rotate on the basis of the Lorentz force. The magnet assembly 17 is made up of a permanent magnet 16*b*, a yoke 18*b*, and posts 19*b* and 19*c*. The head 9 is comprised of a servo head and a data read/write head, although not shown in the figure. The arm assembly 12 has a servo arm and a data arm respectively associated with the servo head and the data read/write head, although not shown in the figure.

In operation, the arm assembly 12 is moved at high speed in a rotary motion by the force of the magnetic circuit. Since the movable range of the arm assembly 12 is limited by the two posts 19*b* and 19*c*, the diameter of the posts 19*b* and 19*c* has to be small enough to promote the miniaturization of the disk apparatus while maintaining such a movable range. Further, to build the arm assembly 12 in the assembly of the spindle shaft 2, bearing, spindle hub and disk drive motor, it is necessary for the head 9 to be once retracted away from the disk 1 and then moved toward the outer circumference of the disk 1 over the greatest possible distance. Hence, in the event of assembly, the arm assembly 12 is brought to a position extremely close to one of the posts 19*b* and 19*c*. In this respect, too, the posts 19*b* and 19*c* should be as thin as possible for the miniaturization of the disk apparatus.

On the other hand, the prerequisite for the high speed operation of the device is that the magnetic circuit has high performance. In practice, however, the miniaturization of the entire disk apparatus limits the space available for the magnetic circuit and, therefore, the thickness of the yoke 18*b* forming the magnetic circuit. For this reason, it has been customary to implement even the posts 19*b* and 19*c* with a magnetic material and cause them to play the role of a yoke in cooperation with the yoke 18*b*. However, since the posts 19*b* and 19*c* should not be thick from the miniaturization standpoint. As a result, fluxes leaking from the magnetic circuit effect the head 9 and prevent it from reading or writing data accurately.

Figure 2:
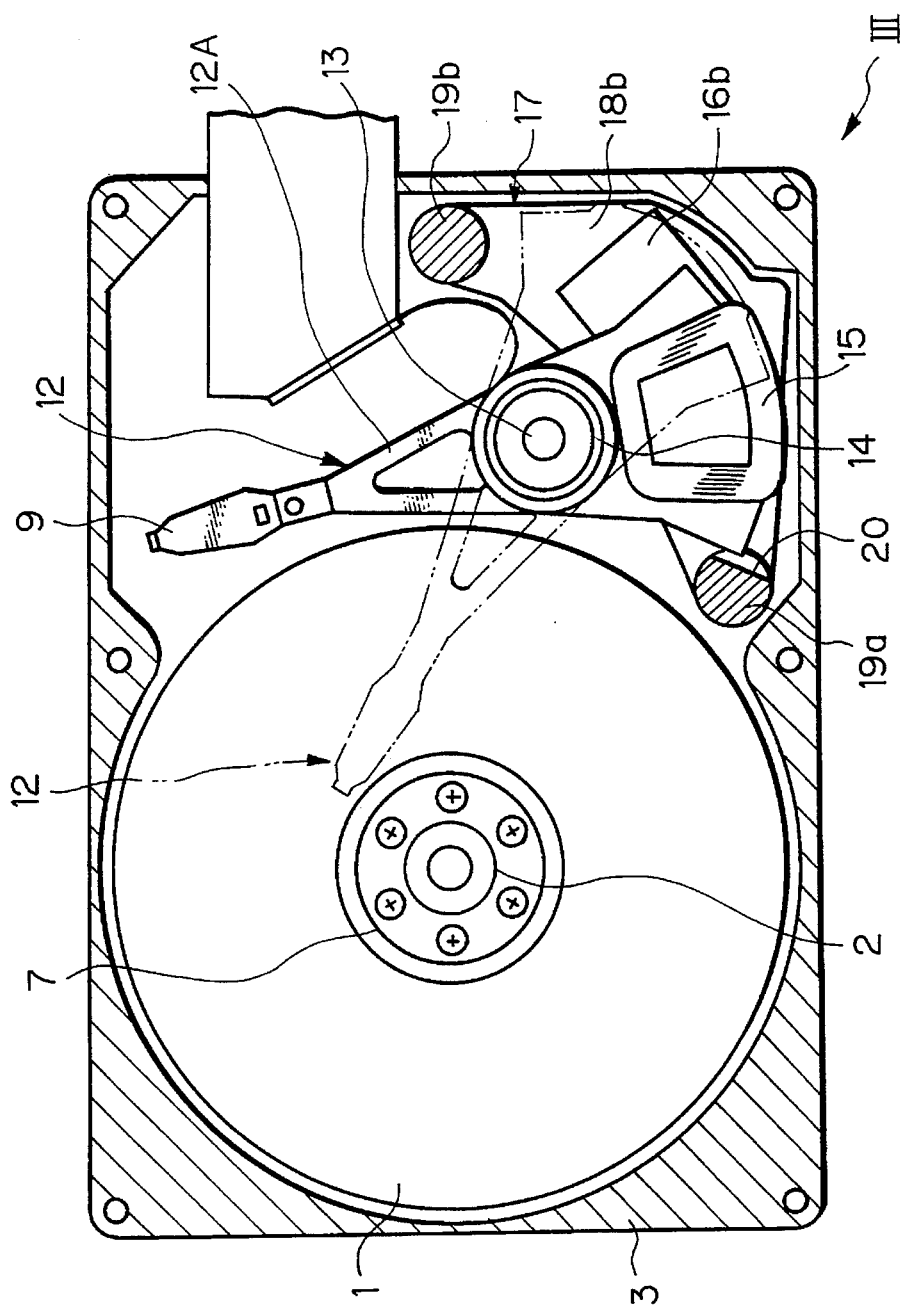
FIG. 2 is a partly taken away plan view showing a head driving device embodying the present invention and a magnetic disk apparatus incorporating it.
Figure 3:
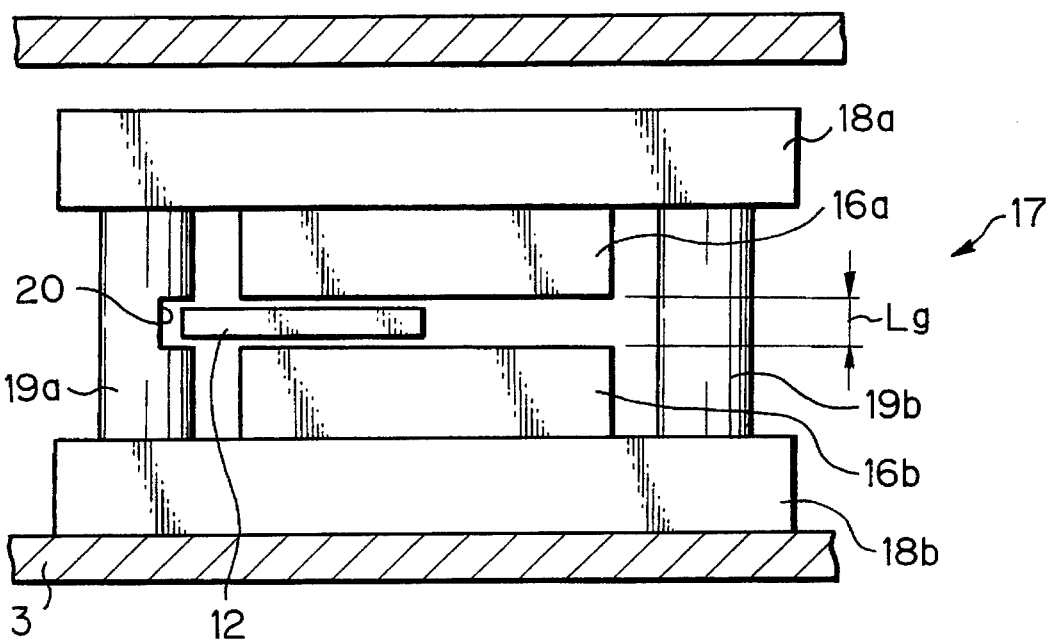
FIG. 3 is a fragmentary side elevation as seen in a direction indicated by an arrow III in FIG. 2.
Figure 4:
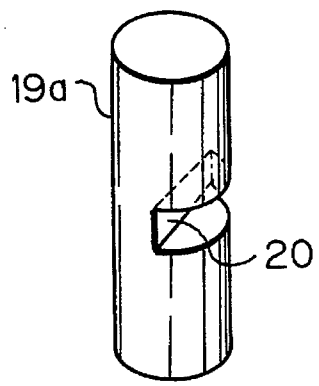
FIG. 4 is a perspective view showing a specific configuration of a post included in the embodiment.

Referring to FIGS. 2 through 5, a magnetic disk apparatus with a head driving device embodying the present invention will be described. In FIGS. 2 through 5, the same or similar constituent parts as or to the parts shown in FIG. 1 are designated by the same reference numerals. As shown in FIGS. 2 and 3, the device has an arm assembly 12 made up of an arm 12A, a rotary shaft 13, and a permanent magnet assembly 17. The arm 12A carries a magnetic head 9 on one end thereof and a coil 15 at the other end. The arm 12A is rotatably supported by a base 3 via the shaft 13. The permanent magnet assembly 17 consists of posts, or support members, 19a and 19b, permanent magnets 16a and 16b facing each other, and yokes 18a and 18b. The magnets 16a and 16b are supported by posts 19a and 19b via the yokes 18a and 18b, respectively. The coil 15 is inserted between the opposite poles of the magnets 16a and 16b. In this configuration, the arm assembly 12 is rotated by the Lorentz force generated in the coil 15. In the illustrative embodiment, the post 19a is formed with a semicircular recess 20, as best shown in FIG. 4. When the arm assembly 12 is rotated as mentioned above, it is partly received in the recess 20. The posts 19a and 19b are made of a magnetic material. The recess 20 has a width, as measured in the axial direction of the post 19a, substantially equal to a distance Lg, FIG. 3, between the opposite poles of the magnets 16a and 16b.

Specifically, a spindle shaft 2 is affixed to a base 3 at opposite ends thereof. Magnetic disks 1 and spacer rings, not shown, are alternately stacked on a spindle hub, not shown, and retained together by a clamp ring 7. A spindle motor, not shown, causes the disks 1 and spacer rings to spin at high speed via a bearing, not shown. A magnetic head 9 is associated with each of the disks 1 and supported by the arm assembly 12. The arm assembly 12 is rotatably supported by a rotary shaft 13 via bearings 14. The coil 15 of the arm assembly 12 and the magnet assembly 17 generate a magnetic circuit for rotating the head 9. The head 9 is made up of a servo head for positioning and a data read/write head while the arm assembly 12 is made up of a servo arm and a data arm, as in the conventional arrangement.

To build the arm assembly 12 in the spindle assembly consisting of the spindle shaft 2, bearing, spindle hub and disk drive motor, the head 9 is moved away from the outer circumference of the disk 1 as far as possible since the space available in the apparatus is limited. As a result, the arm assembly 12 is brought to a position extremely close to the post 19a, but it is received in the recess 20 of the post 19a. Therefore, the post 19a is equivalent to a thin post even through it may have a substantial diameter, promoting the miniaturization of the apparatus.

On the other hand, the posts 19a and 19b, made of a magnetic material for playing the role of a yoke, prevent the magnetic circuit from magnetically saturating and, therefore, enhance high speed operation. This can be done since the post 19a has a sufficient thickness, except for the portion where the recess 20 is formed.

The width of the recess 20 should preferably be substantially equal to the gap Lg of the magnet assembly 17, as stated earlier. This is because the recess 20 functions in the same manner as a gap included in the magnetic circuit. In this condition, a minimum of flux is allowed to leak from the magnetic circuit. The head 9 is, therefore, free form the influence of flux leakage and can read and write data in a stable manner. To further reduce flux leakage, the yokes 18a and 18b and posts 19a and 19b may be formed integrally with each other.

Figure 5:
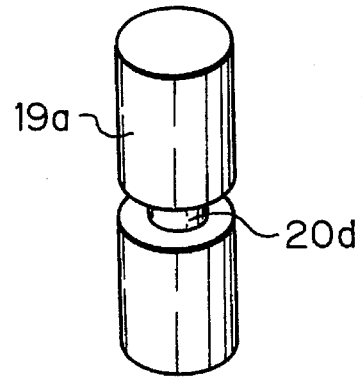
FIG. 5 is a perspective view showing another specific configuration of the post.

While the recess 20 has been shown and described as being formed in the post 19a, it may be formed only in the other post 19b or in both the posts 19a and 19b. As shown in FIG. 5, the semicircular recess 20 may be replaced with a circumferential groove 20d, if desired.

In summary, it will be seen that the present invention provides a head driving device which provides support members, included in a permanent magnet assembly, with a sufficient thickness while reducing the overall size of a magnetic disk apparatus. The device, therefore, prevents a magnetic circuit from saturating and frees a magnetic head from the influence of flux leakage. This allows the head to write and read data out of a magnetic disk accurately. Such advantages are derived from the fact that at least one of the support members is formed with a recess or groove for receiving an arm assembly during the rotation of the assembly, i.e., the arm assembly can rotate over the same range as when a thin support member is used.

Various modifications will become possible for those skilled in the art after receiving the teachings of the present disclosure without departing from the scope thereof.

What is claimed is:

1. A device for driving a magnetic head which is included in a magnetic data recording and reproducing apparatus for writing and reading data out of a magnetic recording medium, said device comprising:

an arm assembly comprising an arm carrying said magnetic head on one end and a coil on the other end, and a rotary shaft supporting said arm between said coil and said magnetic head and rotatably mounting said arm to a base of the magnetic recording and reproducing apparatus; and a permanent magnet assembly comprising a pair of yokes, a pair of permanent magnets having opposite polarities thereof facing each other at a predetermined distance, and a pair of support members supporting said pair of yokes and said pair of permanent magnets, said supporting members being made of magnetic material to be part of said yoke, said permanent magnet assembly being affixed to said base;

at least one of said support members being formed with a recess for receiving part of said arm assembly when said arm assembly is rotated, said support member having enough of said magnetic material adjacent said recess to prevent magnetic saturation.

2. A device as claimed in claim 1, wherein said support members and said yokes are formed integrally with each other.

3. A device as claimed in claim 1, wherein said support members comprise a pair of posts spaced apart from each other, said recess being formed in at least one of said pair of posts.

4. A device as claimed in claim 3, wherein said recess extends a predetermined distance in an axial direction of said posts.

5. A device as claimed in claim 4, wherein said predetermined distance is substantially equal to said predetermined distance between the opposite polarities of said permanent magnets.

6. A device as claimed in claim 4, wherein said recess is semicircular as seen in the axial direction of said posts.

7. A device as claimed in claim 4, wherein said recess is annular as seen in the axial direction of said posts.

* * * * *